US012038380B2

(12) United States Patent
Schumann

(10) Patent No.: US 12,038,380 B2
(45) Date of Patent: Jul. 16, 2024

(54) FLUORESCENCE MICROSCOPE AND METHOD FOR IMAGING AN OBJECT

(71) Applicant: LEICA MICROSYSTEMS CMS GMBH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 47 days.

(21) Appl. No.: 17/910,857

(22) PCT Filed: Feb. 26, 2021

(86) PCT No.: PCT/EP2021/054862
§ 371 (c)(1),
(2) Date: Sep. 12, 2022

(87) PCT Pub. No.: WO2021/185557
PCT Pub. Date: Sep. 23, 2021

(65) Prior Publication Data
US 2023/0129462 A1 Apr. 27, 2023

(30) Foreign Application Priority Data
Mar. 20, 2020 (DE) ...................... 10 2020 107 762.9

(51) Int. Cl.
*G01N 21/64* (2006.01)
*G02B 21/00* (2006.01)
*G02B 21/18* (2006.01)

(52) U.S. Cl.
CPC ..... *G01N 21/6458* (2013.01); *G02B 21/0076* (2013.01); *G02B 21/18* (2013.01); *G01N 2021/6441* (2013.01)

(58) Field of Classification Search
CPC ....... G01N 21/6458; G01N 2021/6441; G01N 2021/6421; G01N 2021/6471; G02B 21/0076; G02B 21/18; G02B 21/16
See application file for complete search history.

(56) References Cited

U.S. PATENT DOCUMENTS

2002/0030812 A1\* 3/2002 Ortyn ................... G01N 15/147
356/73
2006/0253035 A1\* 11/2006 Stern .................. G01N 21/6428
600/476

(Continued)

FOREIGN PATENT DOCUMENTS

DE 102008062791 A1 7/2010
DE 102010045856 A1 3/2012

(Continued)

OTHER PUBLICATIONS

Zimmermann, Timo, "Spectral Imaging and Linear Unmixing in Light Microscopy," Advanced Biochemical Engineering/Biotechnology, Dec. 2005, vol. 95, 245-265, Springer-Verlag, Germany.

(Continued)

*Primary Examiner* — David P Porta
*Assistant Examiner* — Mamadou Faye
(74) *Attorney, Agent, or Firm* — LEYDIG, VOIT & MAYER, LTD.

(57) ABSTRACT

A fluorescence microscope, includes an optical system configured to collect fluorescent light emitted from different fluorophore species within a field of view and to focus the fluorescent light for detection, a spectral splitting arrangement configured to split the fluorescent light into at least two spectrally different fluorescent light components, a multichannel detector system including at least two image sensors configured to detect at least two spatial light intensity distributions based on the at least two spectrally different fluorescent light components, each spatial light intensity distribution representing an image of the object over the field of view, and a processor configured to determine spatial distributions of the different fluorophore species based on a spectral unmixing analysis of each spatial light intensity distribution, wherein the processor is further configured to (Continued)

obtain compensation information and to determine a spatial distribution of each fluorophore species by taking into account the compensation information.

20 Claims, 5 Drawing Sheets

(56) References Cited

U.S. PATENT DOCUMENTS

| | | |
|---|---|---|
| 2013/0235255 A1 | 9/2013 | Westphal et al. |
| 2018/0196246 A1* | 7/2018 | Bares .................... G01J 3/0208 |
| 2021/0165198 A1 | 6/2021 | Mueller-Rentz et al. |

FOREIGN PATENT DOCUMENTS

| | | |
|---|---|---|
| DE | 102018124129 A1 | 6/2019 |
| DE | 102018129833 A1 | 6/2019 |

OTHER PUBLICATIONS

Sebastian Malkusch et al.: "Coordinate-based colocalization analysis of single-molecule localization microscopy data" Histochemistry and Cell Biology, Springer, Berlin, Germany, vol. 137, No. 1, Nov. 16, 2011 (Nov. 16, 2011), pp. 1-10, XP019996004.

* cited by examiner

FLUORESCENCE MICROSCOPE AND METHOD FOR IMAGING AN OBJECT

CROSS REFERENCE TO RELATED APPLICATIONS

This application is a U.S. National Phase application under 35 U.S.C. § 371 of International Application No. PCT/EP2021/054862, filed on Feb. 26, 2021, and claims benefit to German Patent Application No. DE 10 2020 107 762.9 filed on Mar. 20, 2020. The International Application was published in English on Sep. 23, 2021, as WO 2021/185557 A1 under PCT Article 21(2).

FIELD

The present invention relates to a fluorescence microscope and a method for imaging an object including different fluorophore species having distinct spectral emission characteristics.

BACKGROUND

In the field of fluorescence microscopy, multi-channel systems have been established which enable a user to simultaneously image a plurality of fluorophore species having different emission spectra onto several image sensors. In order to spectrally split the fluorescent light emitted by the different fluorophore species, spectral image splitting arrangements are used. Such an image splitting arrangement comprises at least one splitting surface which may be formed from a cemented layer, e.g. in case of cemented dichroic coatings in prism arrangements, or an outside surface of a thin substrate such as provided in standard dichroic mirrors.

In addition to moderate edge steepness and spectral selectivity, the spectral splitting achieved by such a splitting surface is highly dependent on the incidence angle of the fluorescent light. This means that the spectral separation is highly dependent on the angle at which the fluorescent light is incident on the splitting surface, wherein this angle is assigned to a specific point within the field of view (FOV) from which the fluorescent light emerges towards the splitting surface. Thus, the afore-mentioned angle is to be understood as a chief ray angle for this particular object point.

In order to achieve a FOV-independent spectral separation, it may be considered to use an optical system which is configured to be telecentric on an image side. Thus, in case of a telecentric system, the chief ray incidence angle at which the fluorescent light is incident on the splitting surface does not vary over the FOV. Further, when a FOV independent spectral separation is secured, linear unmixing methods as disclosed e.g. in the publication of Zimmermann, Advanced Biocemical Engineering/Biotechnology (2005), Vol. 95, 245-265 may be applied to analyze the detected images.

However, a telecentric optical system has disadvantages as regards the size of the optical components thereof. Thus, the lenses and the spitting surface included in the optical system must not be smaller than the FOV which is detrimental in terms of costs and optical design. Also, the requirements of the pupil imaging for telecentricity usually enlarge the optical system.

SUMMARY

In an embodiment, the present disclosure provides a fluorescence microscope for imaging an object including different fluorophore species having distinct spectral emission characteristics, comprising an optical system configured to collect fluorescent light emitted from the different fluorophore species within a field of view and to focus the fluorescent light for detection, a spectral splitting arrangement configured to split the fluorescent light collected within the field of view into at least two spectrally different fluorescent light components, a multi-channel detector system comprising at least two image sensors configured to detect at least two spatial light intensity distributions based on the at least two spectrally different fluorescent light components, each spatial light intensity distribution representing an image of the object over the field of view, and a processor configured to determine spatial distributions of the different fluorophore species based on a spectral unmixing analysis of each spatial light intensity distribution, wherein the processor is further configured to obtain compensation information representing a variation of spectral characteristics of the spectral splitting arrangement over the field of view and to determine a spatial distribution of each fluorophore species by taking into account the compensation information.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
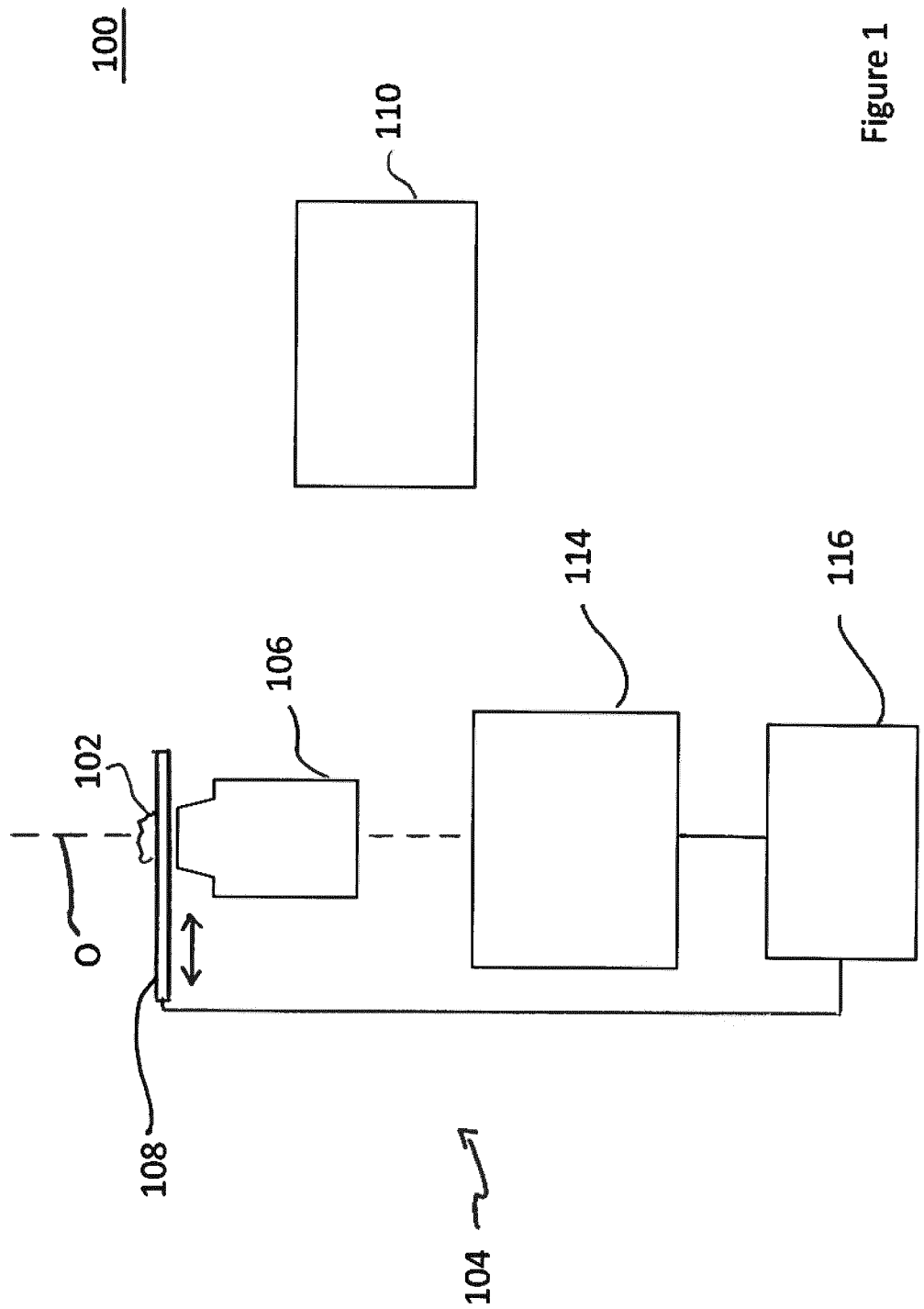
FIG. 1 is a schematic diagram showing a fluorescence microscope according to an embodiment.

In an embodiment, the present invention provides a fluorescence microscope and a method enabling a reliable multi-channel imaging of an object including different fluorophore species having distinct spectral emission characteristics by means of a compact detector design.

In an embodiment, a fluorescence microscope for imaging an object including different fluorophore species having distinct spectral emission characteristics comprises an optical system configured to collect fluorescent light emitted from the different fluorophore within a field of view (FOV) and to focus the fluorescent light for detection. The fluorescence microscope comprises a spectral splitting arrangement (spectral splitting device) configured to split the fluorescent light collected within the FOV into at least two spectrally different fluorescent light components. The fluorescence microscope comprises a multi-channel detector system comprising at least two image sensors configured to detect at least two spatial light intensity distributions based on the at least two spectrally different fluorescent light components, wherein each spatial light intensity distribution represents an image of the object over the FOV. The fluorescence microscope further comprises a processor configured to determine spatial distributions of the different fluorophore species based on a spectral unmixing analysis of each spatial light intensity distribution. The processor is further configured to obtain compensation information representing a variation of spectral characteristics of the dispersive system over said FOV and to determine a spatial distribution of each fluorophore species by taking into account the compensation information.

The fluorescence microscope as claimed allows for considering a FOV-dependent variation of the spectral separation effected by the spectral splitting arrangement. Thus, on the one hand, it is not required to configure the optical system to be telecentric on an image side or in the area of the spectral splitting arrangement, providing benefits in terms of costs and optical design. In particular, the lenses and the spectral splitting arrangement included in the optical system need not to be as large as the FOV in order to secure proper imaging. On the other hand, utilizing the compensation information which indicates a FOV-dependent variation of the spectral separation, enables a suitable unmixing analysis without having to rely on conventional linear unmixing methods.

Preferably, the processor is configured to determine intensity contributions to each spatial light intensity distribution, which are induced by the different fluorophore species, based on said spectral unmixing analysis.

The optical system may be formed by a wide field optical system. However, the fluorescence microscope is not limited thereto. According to an alternative embodiment, the optical system may serve to sequentially image the object pixel by pixel, wherein a resulting image is composed from a plurality of pixels.

In an embodiment, the optical system may be configured to be non-telecentric in the area of the spectral splitting arrangement, in the most common case on an image side. As explained above, using a non-telecentric configuration has significant benefits in terms of design and costs. Moreover, the wide field optical system may comprise an exit pupil having a finite pupil position. This enables more flexibility when using a magnification changing system which needs to be configured to be an afocal system having a constant exit pupil position in order to maintain telecentricity. In particular, as telecentricity is not required with the configuration disclosed herein, a simple tube lens changer may be used which is generally not telecentric on the image side for all magnification settings.

Preferably, the spectral splitting arrangement comprises at least one splitting surface whose spectral characteristic varies depending on an incidence angle of a chief ray of the fluorescent light. The FOV-dependent characteristic of the splitting surface may be utilized to obtain the aforementioned compensation information.

The splitting surface may be configured to transmit the fluorescent light in a first spectral range and to reflect the fluorescent light in a second spectral range, said first and second spectral ranges being separated by a spectral transition range which varies depending on the incidence angle of the chief ray of the fluorescent light.

The spectral splitting arrangement may comprise at least one prism. For instance, the dispersive system may be configured as a Bauernfeind prism known from the art. Alternatively, the spectral splitting arrangement may comprise at least one plate beam splitter.

According to an embodiment, the processor is configured to use a model-based spatial light intensity distribution for each image sensor, wherein the model-based spatial light intensity distribution includes the afore-mentioned compensation information as a preset parameter and the spatial distribution of each fluorophore species as a fit parameter. The processor is further configured to determine the spatial distribution of fluorophore species by optimizing the model-based spatial light intensity distribution to match the spatial light intensity distribution detected by the respective image sensor. For instance, the processor may apply an optimization procedure which is executed in order to maximize an objective function. The objective function may represent a probability for obtaining the experimental data, i.e. the spatial light intensity distribution detected by the respective image sensor, when considering all potential spatial distributions of the fluorophore species.

The model-based spatial light distribution $I_m(\vec{x}')$ may be given by the following relationship:

$$I_m(\vec{x}') = \iiint c_n(\vec{x}) \cdot h(\vec{x},\vec{x}',\lambda') \cdot Ex_n(\lambda) \cdot Ill_m(\vec{x},\lambda) \cdot Em_n(\lambda') \cdot D_m(\vec{x},\lambda') d\lambda d\lambda' d^2\vec{x} \quad (1)$$

wherein:
m is an index designating a spectral channel including the respective image sensor and an illumination distribution generated by a light source assigned to the spectral channel;
n is an index designating the respective fluorophore species;
$\vec{x}, \vec{x}'$ are spatial coordinates;
$\lambda$ is an excitation wavelength of illumination light;
$\lambda'$ is an emission wavelength of fluorescence light;
$c_n(\vec{x})$ is a spatial distribution of fluorophore species n;
$h(\vec{x},\vec{x}',\lambda')$ is a point spread function of the optical system;
$Ex_n(\lambda)$ is a fluorescence excitation spectrum of fluorophore species n;
$Ill_m(\vec{x},\lambda)$ is the illumination distribution of image sensor m;
$Em_n(\lambda')$ is a fluorescence emission spectrum of fluorophore species n; and
$D_m(\vec{x},\lambda')$ is a detection spectrum of image sensor corresponding to spectral channel m.

On the right side of equation (1), all terms apart from $c_n(\vec{x})$ may be known. In other words, these terms may be considered as preset parameters so that the term $c_n(\vec{x})$ designating the spatial distribution of fluorophore species n is the only unknown parameter to be determined.

The model-based spatial light distribution $I_m(\vec{x}')$ according to equation (1) may be derived as follows:

In a multi-color fluorescence experiment, an excitation probability of a fluorophore of the species n=a1, ..., N−1 when imaging in a colored channel m=0, 1, ..., M−1 (M≥N) may be modeled as indicated in equation (2):

$$p_{nm}^{exc}(\vec{x}) = \int Ex_n(\lambda) \cdot Ill_m(\vec{x}, \lambda) d\lambda \quad (2)$$

As already mentioned above, the term $Ex_n(\lambda)$ designates the fluorescence excitation spectrum of fluorophore species n, and the term $Ill_m(\vec{x},\lambda)$ designates the illumination spectrum of the light source of channel m representing the afore-mentioned color channel.

Further, a detection probability may be modeled as indicated in equation (3):

$$p_{nm}^{det}(\vec{x}) = \int Em_n(\lambda') \cdot D_m(\vec{x}, \lambda')d\lambda' \quad (3)$$

As mentioned above, $Em_n(\lambda')$ designates the fluorescence emission spectrum of fluorophore species n, and the term $D_m(\vec{x},\lambda')$ designates the detection spectrum of image sensor of channel m in equation (3).

It is to be noted that both the detection spectrum $D_m(\vec{x},\lambda')$ and the illumination spectrum $Ill_m(\vec{x},\lambda)$ may be location-dependent. Accordingly, the spatial light distribution $I_m(\vec{x}')$ according to equation (1) results from a model as defined by equations (2) and (3).

According to an embodiment, the processor may be configured to control the fluorescence microscope to sequentially execute the following steps: a first step of detecting the at least two spatial light intensity distributions by means of the at least two image sensors; and a second step of determining the spatial distribution of each fluorophore species by optimizing the model-based spatial light intensity distribution to match the spatial light intensity distribution detected by the respective image sensor.

According to an embodiment, the processor may be configured to control the fluorescence microscope to sequentially execute the following steps: a first step of detecting the at least two spatial light intensity distributions by means of the at least two image sensors; a second step of shifting the object relative to the optical system; a third step of detecting the at least two spatial light intensity distributions by means of the at least two image sensors on the object shifted in the second step, wherein the second and third steps are sequentially performed at least once; and a fourth step of determining the spatial distribution of each fluorophore species by optimizing the model-based spatial light intensity distribution to match the spatial light intensity light distributions detected by the respective image sensor in the first and third steps. Preferably, in the second step, the object is shifted relative to the optical system such that spectral imaging of at least one object point differs after movement. In particular, the object may be shifted perpendicular to the optical axis of the optical system. By applying this method, the spectral information to be used for the unmixing analysis can be enhanced.

The fluorescent microscope may comprise a microscope stage configured to be shifted relative to the optical system perpendicular to an optical axis thereof.

In an embodiment, the fluorescence microscope comprises an illumination device configured to provide at least one of epifluorescence illumination, TIRF illumination, and light sheet illumination.

According to an aspect, a method is provided for imaging an object including different fluorophore species having distinct spectral emission characteristics, comprising the following steps: collecting fluorescent light emitted from the different fluorophore species within a FOV and focusing the fluorescent light for detection by means of an optical system; splitting the fluorescent light collected within the FOV into a plurality of spectrally different fluorescent light components by means of a spectral splitting arrangement; detecting at least two spatial light intensity distributions based on the at least two spectrally different fluorescent light components by means of a multi-channel detector system, each spatial light intensity distribution representing an image of the object over the FOV; and determining spatial distributions of the different fluorophore species based on a spectral unmixing analysis of each spatial light intensity distribution, wherein compensation information is obtained, said compensation information representing a variation of spectral characteristics of the spectral splitting arrangement over the FOV and to determine a spatial distribution of each fluorophore species by taking into account said compensation information.

FIG. 1 shows a fluorescence microscope 100 which is adapted to image an object 102 which includes different fluorophore species having distinct spectral emission characteristics. Accordingly, the fluorescence microscope 100 shown in FIG. 1 may be used to execute a multi-color fluorescence experiment in which fluorophores of different species are excited to emit fluorescent light in different wavelength ranges. According to the embodiment of FIG. 1, the fluorescence microscope 100 is configured as a wide field microscope without being limited thereto.

The fluorescence microscope 100 comprises an optical system 104 including an objective 106 facing the object 102 from below a microscope stage 108. The microscope stage 108 may be a motorized stage which can be moved in a direction perpendicular to an optical axis O of the optical system 104. The fluorescence microscope 100 further comprises an illumination device 110 which is configured to emit illumination light 112 in order to excite the fluorophore species included in the object 102 to emit fluorescent light. The concrete implementation of illumination may be selected depending on the specific application. For instance, the illumination device 110 may be configured to provide for epifluorescence illumination, TIRF illumination, or light sheet illumination as illustrated in FIG. 1 by different optical illumination paths 112.

The fluorescence microscope 100 further comprises a spectral detector unit 114 (shown in more detail in FIG. 2) and a processor 116 which may be configured to control the entire operation of the fluorescence microscope 100. In the present context, the processor 116 is used to control the spectral detector unit 114 and the motorized microscope stage 108.

Figure 2:
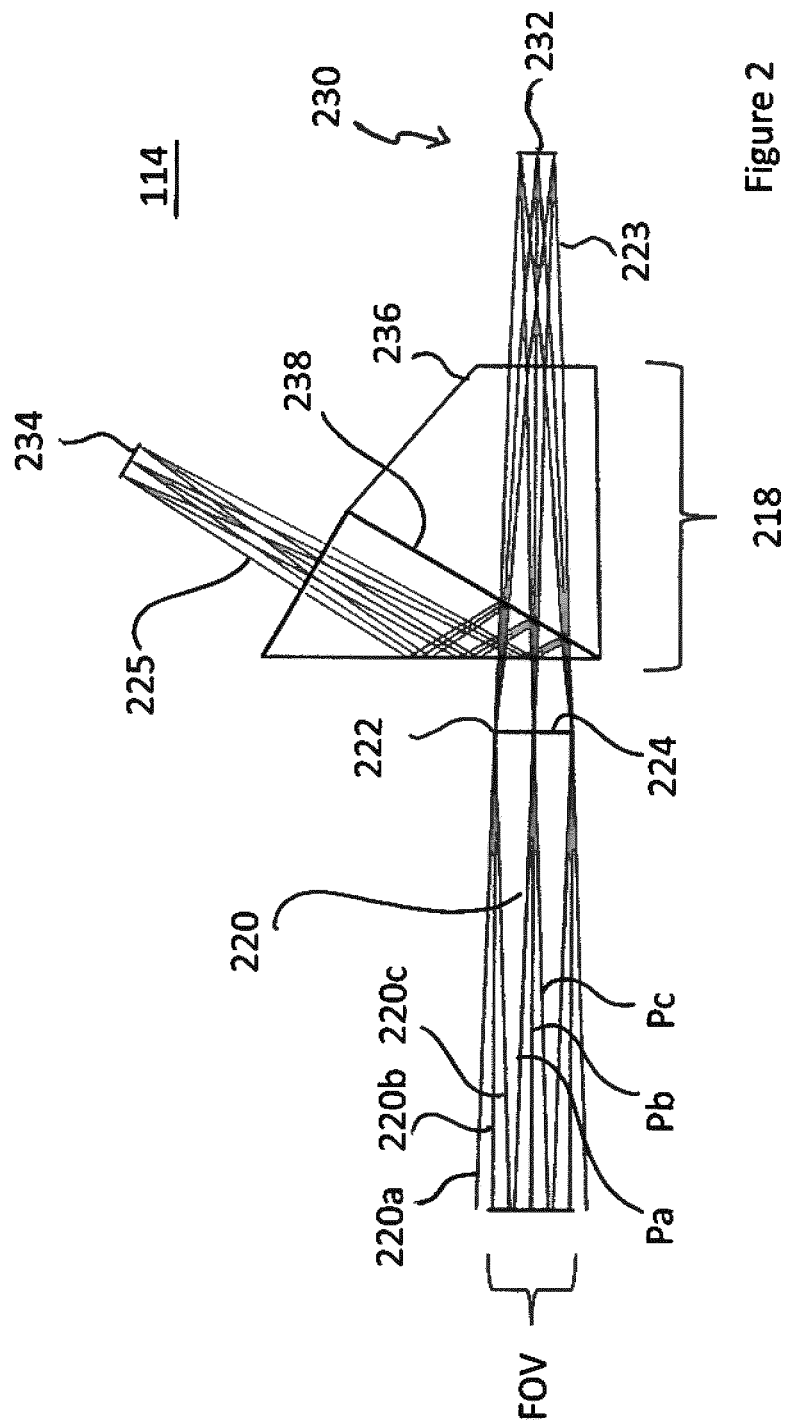
FIG. 2 is a schematic diagram illustrating a non-telecentric beam path in a multi-channel detector system of afluorescence microscope.

As shown in FIG. 2, the spectral detector unit 114 comprises a spectral splitting arrangement 218 which is configured to spatially split fluorescent light 220 which is collected within a field of view FOV by the optical system 104. It is to be noted that the objective 106 being part of the optical system 104 is omitted in FIG. 2. Further, in addition to the objective 106, the optical system 104 comprises a tube lens 224 as shown in FIG. 2.

The spectral detector unit 114 comprises a multi-channel detector system 230 being formed by at least two image sensors 232 and 234. Accordingly, the multi-channel detector system 230 provides at least two color channels enabling multi-color imaging of the object 102.

According to the embodiment shown in FIG. 2, the spectral splitting arrangement 218 may be formed by a prism arrangement 236, e.g. a Bauernfeind prism, comprising a cemented splitting surface 238. The splitting surface 238 transmits the fluorescent light 220 in a first spectral range in order to generate a first fluorescent light component 223 which is received by the first image sensor 232. Likewise, the splitting surface 238 reflects the fluorescent light 220 in a second spectral range being different from the first spectral range in order to generate a second fluorescent light component 225 which is received by the second image sensor 234.

Figure 3:
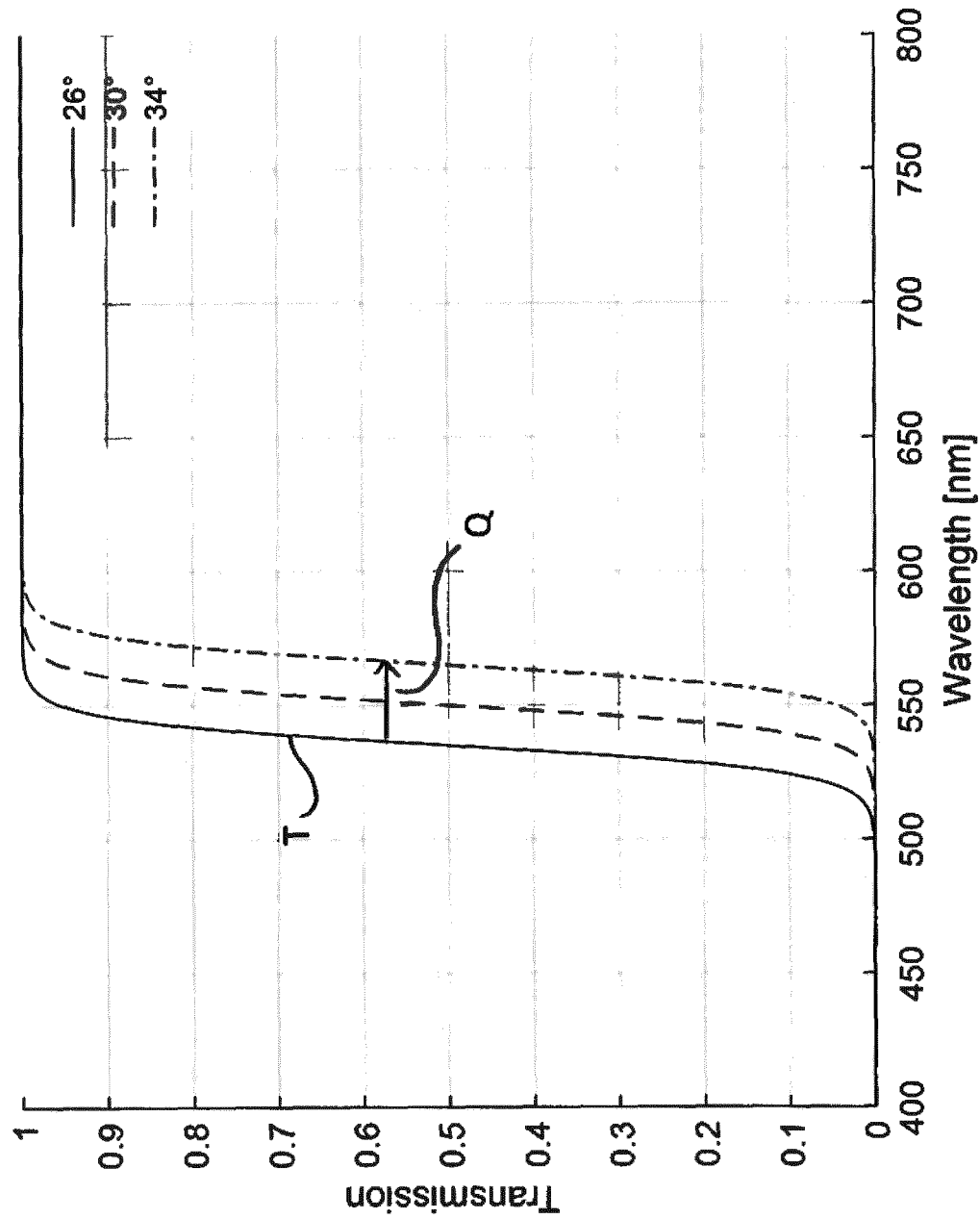
FIG. 3 is a diagram illustrating a variation of spectral characteristics of a splitting surface depending on an incidence angle of fluorescent light.

As illustrated in the diagram of FIG. 3, the splitting surface 238 being formed by a cemented layer exhibits a spectral characteristic which varies depending on an incidence angle of the fluorescent light 220. More specifically, the spectral characteristic of the splitting surface 238 depends on the incidence angle under which a chief ray of a fluorescent light bundle emerging from a specific point within the field of view FOV falls onto the splitting surface 238. FIG. 2 shows three fluorescent light bundles 220a, 220b, 220c, the chief rays Pa, Pb, Pc thereof (i.e. the central ray of the respective bundle) emerging from three different points within the FOV. In FIG. 2, each light bundle 220a, 220b, 220c is illustrated by three parallel light rays wherein a central ray of these light rays represents the respective chief ray Pa, Pb, Pc. Accordingly, the spectral characteristic of the splitting surface varies over the FOV. According to the example illustrated in FIG. 3, the first and second spectral ranges provided by the splitting surface 238 are separated from each other by a spectral transition range having a width of more than 50 nm where the transmission raises from 0 to 1 (for a specific incidence angle). The width of the transition range defines an edge steepness of the spectral characteristic of the splitting surface 238. Further, the transition range is shifted towards larger wavelengths with an increasing incidence angle of the fluorescent light as illustrated by an arrow Q in FIG. 3. In the example of FIG. 3, an increase of the incidence angle from 26° to 34° results in a shift of the transition range of approximately 20 to 30 nm.

As a result of the spectral characteristic shown in FIG. 3, the spectral splitting of the fluorescent light 220 into the spectrally different fluorescent light components 223, 225 varies over the FOV, i.e. is not constant for the different points within the FOV which correspond to the different chief rays Pa, Pb, Pc. Thus, a spectral gradient occurs in the direction of the splitting. As a result, conventional spectral unmixing procedures cannot be applied as these procedures require a constant spectral splitting over the entire FOV.

Figure 4:
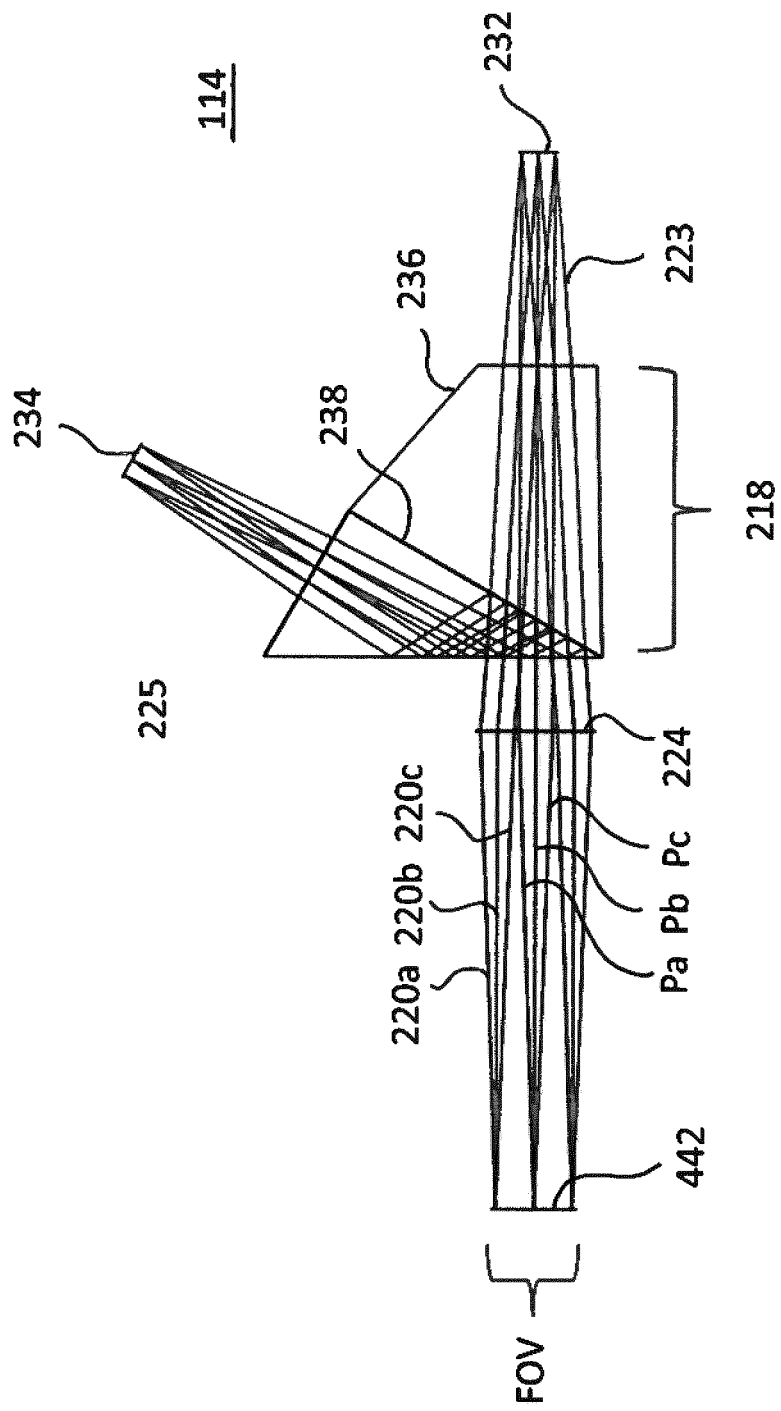
FIG. 4 is a schematic diagram illustrating an optical beam path in a conventional telecentric multi-channel detector system as comparative example.

In order to avoid the problems due to a variation of the spectral splitting over the FOV, it may be considered to configure the optical system 104 as a system which is telecentric on the image side. FIG. 4 shows such a telecentric configuration as comparative example.

In order to enable the splitting surface 238 to achieve a constant spectral splitting over the entire FOV, an entrance pupil 442 is required to be imaged to infinity. In case that the entrance pupil 442 is imaged to infinity, the chief rays Pa, Pb, Pc of all fluorescent light bundles 220a, 220b, 220c emerging from the different points within the FOV fall under the same incidence angle onto the splitting surface 238. As a result, there is no variation of the spectral characteristic of the splitting surface 238 over the FOV. In other words, the spectral characteristic is translationally invariant over the FOV so that conventional unmixing methods can be applied.

However, as can also be seen from FIG. 4, the cross-sections of the beam path at the tube lens 224 and the splitting surface 238 are relatively large. Specifically, the lens and prism surfaces must be at least as large as the FOV.

In order to avoid the disadvantage of large lens and prism surfaces, the configuration shown in FIG. 2 is configured to be non-telecentric on the image side. For this, the entrance pupil 222 is e.g. located such that it coincides with the tube lens 224. Accordingly, the optical system 104 comprises an exit pupil having a finite pupil position. As can be seen in FIG. 2, the non-telecentric configuration enables the cross-sections of the beam path at the locations of the tube lens 224 and the splitting surface 238 to be reduced. As a result, a compact design can be achieved.

According to the configuration shown in FIG. 2, the processor 116 controls each image sensor 232, 234 to detect a spatial light intensity distribution based on the respective fluorescent light component 223, 225. Each of the spatial light intensity distributions detected by the image sensors 232, 234 represents an image of the object over the entire FOV. Then, the processor 116 performs a spectral unmixing analysis of each spatial light intensity distribution detected by the respective image sensor 232, 234 in order to determine spatial distributions of the different fluorophore species.

In order to cope with the fact that according to the configuration of FIG. 2 the spectral splitting caused by the splitting surface 238 varies over the FOV, the processor 116 is configured to take into account compensation information representing the variation of the spectral characteristic of the splitting surface 238 over the FOV when performing the spectral unmixing analysis.

More specifically, when performing the spectral unmixing analysis, the processor 116 determines intensity contributions to each spatial light intensity distribution. For instance, the processor may apply a model-based spatial light intensity distribution for each image sensor. This model-based spatial light distribution may be given by equation (1) as explained above. The model-based spatial light intensity distribution includes the required compensation information as a preset parameter and the spatial distribution of each fluorophore species as a fit parameter. Then, the processor 116 determines the spatial distribution of each fluorophore species by optimizing the model-based spatial light intensity distribution to match the spatial light intensity distribution detected by the respective image sensor.

Figure 5:
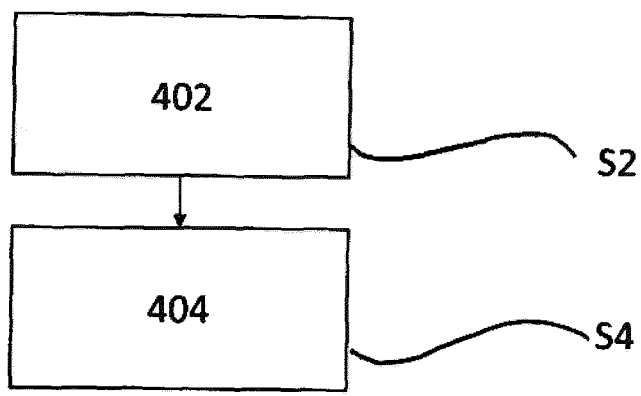
FIG. 5 is a flow diagram showing an embodiment of a method for determining a spatial distribution of a fluorophore species.

FIG. 5 shows a flow diagram illustrating an embodiment of a method for determining the spatial distribution of each fluorophore species.

In step S2, the processor 116 causes each of the image sensors 232, 234 to detect a spatial light intensity distribution which represents an image of the object over the entire FOV.

In step S4, the processor 116 optimizes the model-based spatial light intensity distribution according to equation (1) such that it matches the experimental data which is represented by the spatial light intensity distribution detected by the respective image sensor 232, 234. In other words, the processor reconstructs the term $c_n(\vec{x})$ included in the model-based spatial light intensity distribution according to equation (1) by applying a suitable optimization method.

Figure 6:
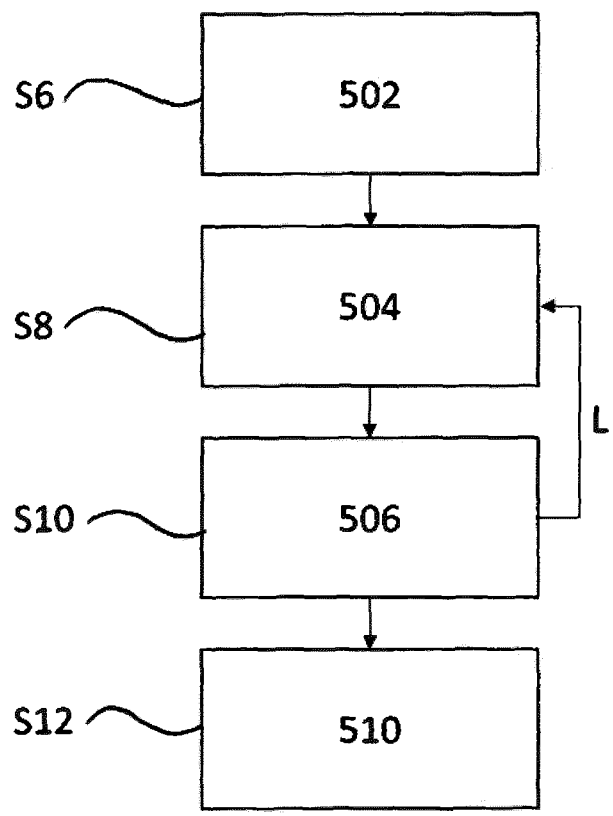
FIG. 6 is a flow diagram showing a modified embodiment of the method for determining the spatial distribution of the fluorophore species.

FIG. 6 shows a flow diagram illustrating a modified method which uses additional spectral information.

In step S6 of the method shown in FIG. 6, the processor 116 causes each of the image sensors 232, 234 to detect a spatial light intensity distribution which represents an image of the object over the entire FOV.

In step S8, the processor 116 controls the motorized microscope stage 108 to move the object 102 relative to the optical system 104 perpendicular to the optical axis O thereof. In other words, the processor controls the FOV to be moved over the object 102. Subsequently, in step S10, the processor 116 causes each of the image sensors 232, 234 to detect a spatial light intensity distribution on the object 102 which has been shifted in step S8. Thus, the light intensity distribution detected by each image sensor 232, 234 represents the shifted FOV.

The steps S8 and S10 are sequentially performed once or repeated in a number of loops L in order to increase the spectral information which be used in the spectral unmixing analysis.

Finally, in step S12, the processor 116 determines the spatial distribution of each fluorophore species. For this, the processor 116 applies an optimization method on the model-based spatial light intensity distribution according to equation (1) such that it matches the spatial light intensity distributions detected by the respective image sensor 232, 234 in steps S6 and S8.

Needless to say that the invention shall not be limited to the specific embodiments described above. For instance, the optical system 104 is formed by a wide field system. However, the optical system may also be configured to sequentially image the object pixel by pixel, e.g. in a scanning microscope. In this case, the processor is configured to combine a plurality of pixel signals to a resulting image to be analyzed as explained above.

Further, the optimization based on equation (1) is to be understood merely as an example. Any other suitable algorithm may be applied to compensate for the FOV dependent spectral splitting.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 fluorescence microscope
102 object
104 optical system
106 objective
108 microscope stage
110 illumination device
112 optical illumination path
114 spectral detector unit
116 processor
218 dispersive system
220 fluorescent light
220a, 220b, 220c fluorescent light bundles
224 tube lens
223, 225 fluorescent light components
230 multi-channel detector system
232, 234 image sensors
236 prism arrangement
238 splitting surface
FOV field of view
O optical axis
P1, P2, P3 points within FOV
T transition range

The invention claimed is:

1. A fluorescence microscope for imaging an object including different fluorophore species having distinct spectral emission characteristics, comprising:
   an optical system configured to collect fluorescent light emitted from the different fluorophore species within a field of view and to focus the fluorescent light for detection,
   a spectral splitting arrangement configured to split the fluorescent light collected within the field of view into at least two spectrally different fluorescent light components,
   a multi-channel detector system comprising at least two image sensors configured to detect at least two spatial light intensity distributions based on the at least two spectrally different fluorescent light components, each spatial light intensity distribution representing an image of the object over the field of view, and
   a processor configured to determine spatial distributions of the different fluorophore species based on a spectral unmixing analysis of each spatial light intensity distribution,
   wherein the processor is further configured to obtain compensation information representing a variation of spectral characteristics of the spectral splitting arrangement over the field of view and to determine a spatial distribution of each fluorophore species by taking into account the compensation information,
   wherein the processor is further configured to use a model-based spatial light intensity distribution for each image sensor, the model-based spatial light intensity distribution including the compensation information as a preset parameter and the spatial distribution of each fluorophore species as a fit parameter, and
   wherein the processor is further configured to determine the spatial distribution of each fluorophore species by optimizing the model-based spatial light intensity distribution to match the spatial light intensity distribution detected by the respective image sensor.

2. The fluorescence microscope according to claim 1, wherein the processor is configured to determine intensity contributions to each spatial light intensity distribution, which are induced by the different fluorophore species, based on the spectral unmixing analysis.

3. The fluorescence microscope according to claim 1, wherein the optical system is formed by a wide field optical system.

4. The fluorescence microscope according to claim 1, wherein the optical system is configured to be non-telecentric in an area of the spectral splitting arrangement.

5. The fluorescence microscope according to claim 3, wherein the wide field optical system comprises an exit pupil having a finite pupil position.

6. The fluorescence microscope according to claim 1, wherein the spectral splitting arrangement comprises at least one splitting surface whose spectral characteristic varies depending on an incidence angle of a chief ray of the fluorescent light.

7. The fluorescence microscope according to claim 1, wherein a splitting surface is configured to transmit the fluorescent light in a first spectral range and to reflect the fluorescent light in a second spectral range, the first and second spectral ranges being separated by a spectral transition range which varies depending on an incidence angle of a chief ray of the fluorescent light.

8. The fluorescence microscope according to claim 1, wherein the spectral splitting arrangement comprises at least one prism.

9. The fluorescence microscope according to claim 1, wherein the model-based spatial light distribution $I_m(\vec{x}')$ is given by the following equation:

$$I_m(\vec{x}') = \iiint c_n(\vec{x}) \cdot h(\vec{x},\vec{x}',\lambda') \cdot Ex_n(\lambda) \cdot Ill_m(\vec{x},\lambda) \cdot Em_n(\lambda') \cdot D_m(\vec{x},\lambda') d\lambda d\lambda' d^2\vec{x}$$

wherein:
m is an index designating a spectral channel including the respective image sensor and an illumination distribution,
n is an index designating the respective fluorophore species,
$\vec{x}, \vec{x}'$ are spatial coordinates,
$\lambda$ is an excitation wavelength of illumination light,
$\lambda'$ is an emission wavelength of fluorescence light,
$c_n(\vec{x})$ is a spatial distribution of fluorophore species n,
$h(\vec{x}, \vec{x}', \lambda')$ is a point spread function of the optical system,
$Ex_n(\lambda)$ is a fluorescence excitation spectrum of fluorophore species n,
$Ill_n(\vec{x}, \lambda)$ is the illumination distribution of the spectral channel m,
$Em_n(\lambda')$ is a fluorescence emission spectrum of fluorophore species n, and
$D_m(\vec{x}, \lambda')$ is a detection spectrum of image sensor m.

10. The fluorescence microscope according to claim 1, wherein the processor is configured to control the fluorescence microscope to sequentially execute the following steps:
a first step of detecting the at least two spatial light intensity distributions by means of the at last two image sensors, and
a second step of determining the spatial distribution of each fluorophore species by optimizing the model-based spatial light intensity distribution to match the spatial light intensity distribution detected by the respective image sensor.

11. The fluorescence microscope according to claim 1, wherein the processor is configured to control the fluorescence microscope to sequentially execute the following steps:
a first step of detecting the at least two spatial light intensity distributions by means of the at last two image sensors,
a second step of shifting the object relative to the optical system,
a third step of detecting the at least two spatial light intensity distributions by means of the at last two image sensors on the object shifted in the second step,
wherein the second and third steps are sequentially performed at least once, and
a fourth step of determining the spatial distribution of each fluorophore species by optimizing the model-based spatial light intensity distribution to match the spatial light intensity distributions detected by the respective image sensor in the first step and third steps.

12. The fluorescence microscope according to claim 1, comprising a microscope stage configured to be shifted relative to the optical system perpendicular to an optical axis thereof.

13. A method for imaging an object including different fluorophore species having distinct spectral emission characteristics, the method comprising:
collecting fluorescent light emitted from the different fluorophore species within a field of view and focusing the fluorescent light for detection by an optical system,
splitting the fluorescent light collected within the field of view into at least two spectrally different fluorescent light components by a spectral splitting arrangement,
detecting at least two spatial light intensity distributions based on the at least two spectrally different fluorescent light components by a multi-channel detector system, each spatial light intensity distribution representing an image of the object over the field of view,
determining spatial distributions of the different fluorophore species based on a spectral unmixing analysis of each spatial light intensity distribution,
obtaining compensation information, the compensation information representing a variation of spectral characteristics of the spectral splitting arrangement over the field of view, so as to determine a spatial distribution of each fluorophore species by taking into account the compensation information,
using a model-based spatial light intensity distribution for each of at least two image sensors, the model-based spatial light intensity distribution including the compensation information as a preset parameter and the spatial distribution of each fluorophore species as a fit parameter, and
determining the spatial distribution of each fluorophore species by optimizing the model-based spatial light intensity distribution to match the spatial light intensity distribution detected by the respective image sensor.

14. A non-transitory computer-readable medium storing program code which, when executed by a processor, facilitates performing of the method according to claim 13.

15. The method according to claim 13, wherein the model-based spatial light distribution $I_n(\vec{x}')$ is given by the following equation:

$$I_m(\vec{x}') = \iiint c_n(\vec{x}) \cdot h(\vec{x},\vec{x}',\lambda') \cdot Ex_n(\lambda) \cdot Ill_m(\vec{x},\lambda) \cdot Em_n(\lambda') \cdot D_m(\vec{x},\lambda') d\lambda d\lambda' d^2\vec{x}$$

wherein:

m is an index designating a spectral channel including the respective image sensor and an illumination distribution, n is an index designating the respective fluorophore species, $\vec{x}, \vec{x}'$ are spatial coordinates, $\lambda$ is an excitation wavelength of illumination light, $\lambda'$ is an emission wavelength of fluorescence light, $c_n(\vec{x})$ is a spatial distribution of fluorophore species n, $h(\vec{x}, \vec{x}', \lambda')$ is a point spread function of the optical system, $Ex_n(\lambda)$ is a fluorescence excitation spectrum of fluorophore species n, $Ill_n(\vec{x}, \lambda)$ is the illumination distribution of the spectral channel m, $Em_n(\lambda')$ is a fluorescence emission spectrum of fluorophore species n, and $D_m(\vec{x}, \lambda')$ is a detection spectrum of image sensor m.

16. The method according to claim 13, further comprising sequentially executing the following steps:
   a first step of detecting the at least two spatial light intensity distributions by means of the at last two image sensors, and
   a second step of determining the spatial distribution of each fluorophore species by optimizing the model-based spatial light intensity distribution to match the spatial light intensity distribution detected by the respective image sensor.

17. The method according to claim 13, further comprising sequentially executing the following steps:
   a first step of detecting the at least two spatial light intensity distributions by means of the at last two image sensors,
   a second step of shifting the object relative to the optical system,
   a third step of detecting the at least two spatial light intensity distributions by means of the at last two image sensors on the object shifted in the second step,
   wherein the second and third steps are sequentially performed at least once, and
   a fourth step of determining the spatial distribution of each fluorophore species by optimizing the model-based spatial light intensity distribution to match the spatial light intensity distributions detected by the respective image sensor in the first step and third steps.

18. The method according to claim 13, further comprising determining intensity contributions to each spatial light intensity distribution, which are induced by the different fluorophore species, based on the spectral unmixing analysis.

19. The method according to claim 13, wherein the optical system is formed by a wide field optical system.

20. The method according to claim 13, the optical system is configured to be non-telecentric in an area of the spectral splitting arrangement.

* * * * *